United States Patent
Ramesh et al.

(10) Patent No.: US 9,668,018 B2
(45) Date of Patent: *May 30, 2017

(54) FLEXIBLE CHANNEL STACKING

(71) Applicant: MaxLinear, Inc, Carlsbad, CA (US)

(72) Inventors: Sridhar Ramesh, San Diego, CA (US); Curtis Ling, Carlsbad, CA (US); Jingnong Yang, Irvine, CA (US)

(73) Assignee: Maxlinear, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/006,337

(22) Filed: Jan. 26, 2016

(65) Prior Publication Data
US 2016/0165302 A1 Jun. 9, 2016

Related U.S. Application Data

(63) Continuation of application No. 14/154,234, filed on Jan. 14, 2014, now Pat. No. 9,247,274.
(Continued)

(51) Int. Cl.
| | |
|---|---|
| *H04N 7/10* | (2006.01) |
| *H04H 40/90* | (2008.01) |
| *H04H 20/63* | (2008.01) |
| *H04N 21/438* | (2011.01) |
| *H04N 21/2385* | (2011.01) |
| *H04N 21/61* | (2011.01) |

(52) U.S. Cl.
CPC ........ *H04N 21/4383* (2013.01); *H04H 20/63* (2013.01); *H04H 40/90* (2013.01); *H04N 7/106* (2013.01); *H04N 21/2385* (2013.01); *H04N 21/615* (2013.01)

(58) Field of Classification Search
None
See application file for complete search history.

(56) References Cited

U.S. PATENT DOCUMENTS

| | | |
|---|---|---|
| 6,356,539 B1 | 3/2002 | Zuliani |
| 6,819,274 B2 | 11/2004 | Krone et al. |
(Continued)

OTHER PUBLICATIONS

Int'l Search Report and Written Opinion for PCT/US2013/028860 dated May 28, 2013.

*Primary Examiner* — Nasser Goodarzi
*Assistant Examiner* — Terrika Peterson
(74) *Attorney, Agent, or Firm* — McAndrews, Held & Malloy, Ltd.

(57) ABSTRACT

A receiver includes a plurality of input paths for receiving and processing a plurality of input RF signals. The input paths isolate one or more portions of corresponding ones of the received input RF signals, and combine the isolated portions of the corresponding ones of the received input RF signals onto one or more output signals. A bandwidth of the isolated portions of the corresponding ones of the received input RF signals and a bandwidth of the output signals are variable. The isolated portions of the corresponding ones of the received plurality of input RF signals are extracted and utilized to generate the output signals. The portions of the corresponding ones of the received plurality of input RF signals may be mapped into one or more channel slots in the time domain. The channel slots may be assigned in the frequency domain to one or more frequency bins.

16 Claims, 12 Drawing Sheets

Related U.S. Application Data

(60) Provisional application No. 61/753,201, filed on Jan. 16, 2013.

(56) References Cited

U.S. PATENT DOCUMENTS

| | | |
|---|---|---|
| 8,345,798 B2 | 1/2013 | Petrovic et al. |
| 8,422,572 B2 | 4/2013 | Forck et al. |
| 2003/0112895 A1 | 6/2003 | Cook et al. |
| 2003/0222831 A1 | 12/2003 | Dunlap |
| 2005/0198672 A1 | 9/2005 | Ikeda |
| 2006/0083335 A1 | 4/2006 | Seendripu et al. |
| 2006/0225098 A1 | 10/2006 | James et al. |
| 2006/0244661 A1 | 11/2006 | Orr et al. |
| 2007/0082603 A1 | 4/2007 | Norin et al. |
| 2009/0290659 A1 | 11/2009 | Petrovic et al. |
| 2010/0023972 A1 | 1/2010 | Summers et al. |
| 2010/0098182 A1 | 4/2010 | Forck et al. |
| 2010/0317387 A1* | 12/2010 | O'Keeffe ........... H04N 7/17309 455/507 |
| 2011/0105068 A1 | 5/2011 | Reddy et al. |
| 2013/0147521 A1 | 6/2013 | Ling |

* cited by examiner

FLEXIBLE CHANNEL STACKING

CROSS-REFERENCE TO RELATED APPLICATIONS/INCORPORATION BY REFERENCE

This patent application is a continuation of U.S. patent application Ser. No. 14/154,234 filed Jan. 14, 2014 (now U.S. Pat. No. 9,247,274), which makes reference to, claims priority to and claims benefit from the U.S. Provisional Patent Application Ser. No. 61/753,201, filed on Jan. 16, 2013.

This application also makes reference to:
U.S. Pat. No. 8,799,964; and
U.S. patent application Ser. No. 13/906,933, May 31, 2013.

Each of the above stated documents is hereby incorporated herein by reference in its entirety.

FIELD OF THE DISCLOSURE

Certain embodiments of the disclosure relate to wireless communication. More specifically, certain embodiments of the disclosure relate to a method and system for flexible channel and band stacking.

BACKGROUND OF THE DISCLOSURE

Existing methods and systems for receiving various wireless signals can be cumbersome and inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for flexible channel and band stacking, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for flexible channel and band stacking. In accordance with various exemplary embodiments of the disclosure, a receiver comprises a plurality of input paths for receiving and processing a plurality of input RF signals. The plurality of input paths isolate one or more portions of corresponding ones of the received plurality of input RF signals, and combine the isolated one or more portions of the corresponding ones of the received plurality of input RF signals onto one or more output signals. A bandwidth of the isolated one or more portions of the corresponding ones of the received plurality of input RF signals and a bandwidth of the one or more output signals may be configured so that it is variable. The isolated one or more portions of the corresponding ones of the received plurality of input RF signals may be extracted and utilized to generate the one or more output signals. The one or more portions of corresponding ones of the received plurality of input RF signals may be mapped in time domain to one or more channel slots. The one or more channel slots may be assigned in frequency domain to frequency bins, which are offset to provide a particular overlap. The mapping and/or the assigning may be done based on a number of the one or more channel slots in time domain, a number of the one or more frequency bins, and/or a bandwidth of one or more channels or one or more frequency bands into which the extracted one or more portions of the corresponding ones of the received plurality of input RF signals is to be stacked. The one or more portions of corresponding ones of the received plurality of input RF signals comprise channels or frequency sub-bands. The plurality of input RF signals are amplified, mixed, filtered, and/or analog-to-digital converted within the plurality of input paths. The combining comprises mixing, adding, filtering, and/or digital-to-analog converting the isolated one or more portions of the corresponding ones of the received plurality of input RF signals within a plurality of output combining paths. The receiver may equalize the isolated one or more portions of the corresponding ones of the received plurality of input RF signals prior to generating the one or more output signals.

Figure 1:
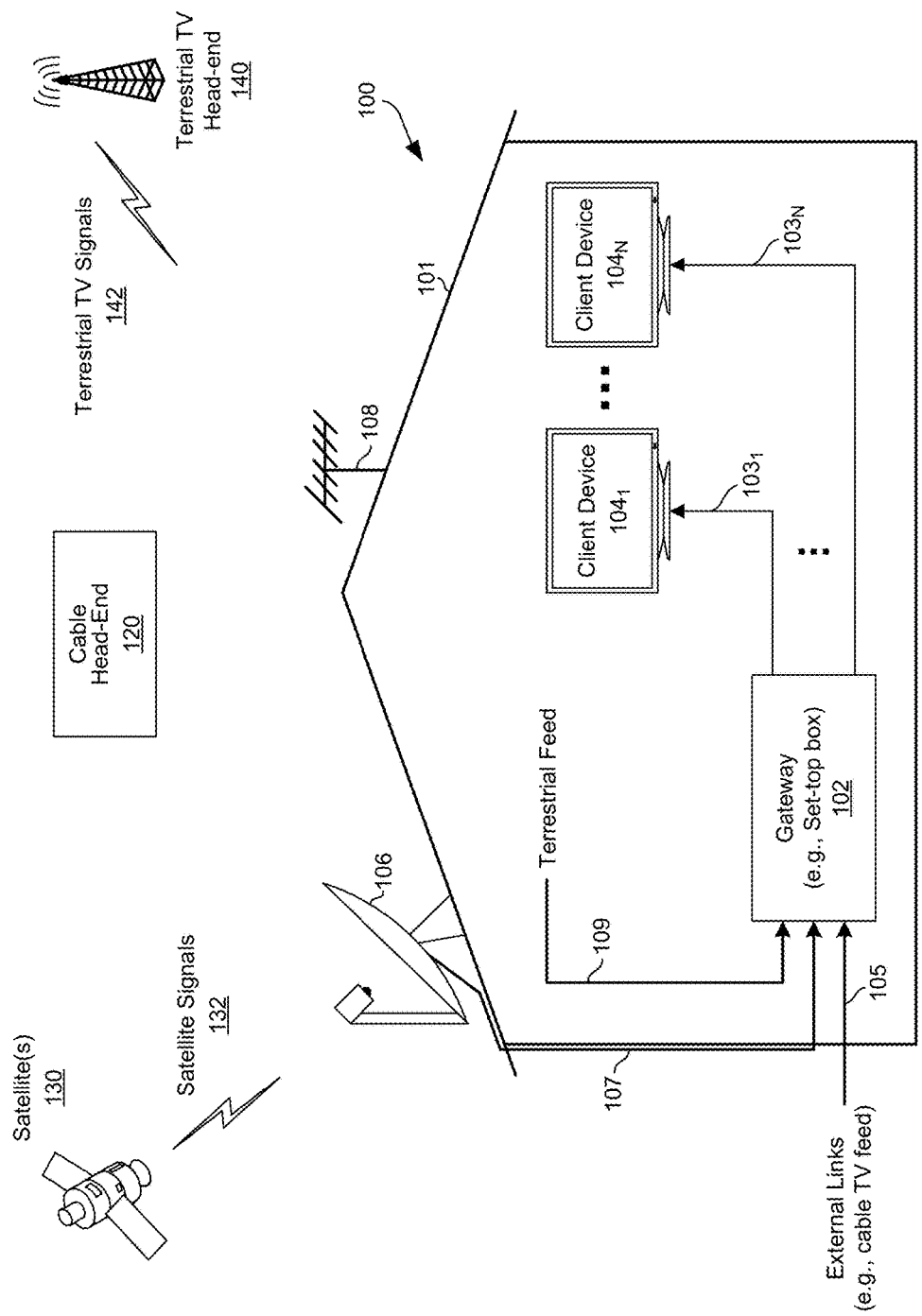
FIG. 1 is a diagram that illustrates an exemplary home network that supports reception of satellite and non-satellite broadcasts, in accordance with an exemplary embodiment of the disclosure.

FIG. 1 is a diagram that illustrates an exemplary home network that supports reception of satellite and non-satellite broadcasts, in accordance with an exemplary embodiment of the disclosure. Referring to FIG. 1, there is shown an in-premises network 100.

The in-premises network 100 may be configured to service particular premises 101 (e.g., residential or commercial). In this regard, the in-premises network 100 may be configured to provide and/or enable broadband and/or television (or other similar content broadcast) access in the premises 101. The in-premises network 100 may comprise, for example, a gateway 102 and a plurality of client devices $104_1$-$104_N$. In this regard, the gateway 102 may comprise suitable circuitry, interfaces, logic, and/or code for enabling servicing of a plurality of client devices (e.g., the client devices $104_1$-$104_N$), which may comprise devices that may communicate with the gateway 102 via one or more point-to-point media links (e.g., HDMI, Display Port, analog video links, digital video links, or the like). The client devices $104_1$-$104_N$ may comprise televisions and similar devices that may be used in displaying or playing back multimedia content that may be broadcasted (e.g., via terrestrial signals, satellite signals, cable signals, and/or over the Internet). The disclosure is not limited, however, to any particular type of client device or multimedia content delivery.

The gateway 102 may be configured to support or enable providing services in the in-premises network 100. The services or functions that may be provided and/or supported by the gateway 102 may pertain to, for example, content distribution and/or broadband access in the in-premises network 100. In this regard, the gateway 102 may be configured to facilitate and/or handle reception and/or transmission of signals that may be used to enable content distribution and/or broadband accessibility in the in-premises network 100 (e.g., to the plurality of client devices $104_1$-$104_N$). This may be achieved by configuring the gateway 102 to support appropriate internal and/or external connections, such as to enable connectivity to the plurality of client devices $104_1$-$104_N$, and/or to various external devices, systems, or networks that may be needed. In this regard, the gateway 102 may be operable to support communications over a plurality of external links (i.e., links that may be utilized in connecting gateway 102 to external entities, such as broadcast or service head-ends), communications over a plurality of internal links (i.e., links used within the in-premises network 100, such as links $103_1$-$103_N$ which may be utilized in connecting the gateway 102 to the client devices $104_1$-$104_N$), and/or to process signals communicated over these links.

One or more of the plurality of internal links $103_1$-$103_N$ may comprise wired, wireless, and/or optical links that may be suited for use in an environment such as the in-premises network 100. For example, one or more of the internal links $103_1$-$103_N$ may comprise wired connections (e.g., HDMI connections, Display Port links, Multimedia over Coax Alliance (MoCA) links, or Ethernet connections), and/or wireless connections (e.g., Wi-Fi, ZigBee, wireless USB, or the like).

The gateway 102 may be operable to obtain content distributed in the in-premises network 100 from one or more broadcast head-end nodes. In this regard, the content delivered to the gateway 102 may be broadcast using wired or wireless signals. For example, the gateway 102 may be configured to terminate wired external links (e.g., link 105), which may be configured to enable communication of content from suitable head-ends over wired connections. For example, link 105 may comprise a coaxial or twisted-pair cable and/or an optical fiber which carries physical layer symbols in accordance with, for example, DSL, DOCSIS, or Ethernet standards (e.g., to facilitate cable television, terrestrial television, and/or Internet accessibility). Accordingly, the link 105 may be utilized to enable connectivity between the gateway 102 and one or more cable (or other similar service provider) head-ends 120.

Connectivity to external/remote sources (e.g., broadcast head-ends) may also be achieved wirelessly—i.e., content may be delivered to the gateway 102 from broadcast head-ends over suitable wireless links. Wireless based connectivity may necessitate, in some instances, use of local auxiliary devices or systems for enabling the wireless communication (reception) of signals. For example, a satellite reception assembly 106 may be utilized (e.g., installed on the roof of the premises 101) to enable satellite based communications (e.g., allow reception of satellite based broadcasts, and, in some instances, transmission of—i.e. uplink, satellite communications). In this regard, a plurality of satellites 130 may be utilized to communicate satellite signals 132 (which may typically comprise only downlink communication signals, but the disclosure is not so limited). In this regard, the satellite signals 132 may be utilized to broadcast satellite television content. The satellite signals 132 may comprise, for example, K, Ka, and/or Ku band Direct Broadcast Satellite (DBS) signals. The disclosure, however, is not limited to any particular type of satellite signal. The satellite reception assembly 106 may be, for example, a satellite "dish". In this regard, the satellite reception assembly 106 may comprise a reflector—for capturing satellite signals (e.g., the satellite signals 132), and circuitry operable to receive and to process the received satellite signals, such as to recover data carried in the satellite signals (e.g., television channels, media content, etc.), and configure a suitable output corresponding to the recovered data for transmission to other devices that may handle use and/or distribution of the data (e.g., to the gateway 102 via a link 107). The link 107 may comprise one or more wired, wireless, and/or optical links. The link 107 may comprise, for example, a wired (e.g., coaxial and/or twisted-pair) and/or wireless communication medium which carries physical layer symbols in accordance with, for example, Multimedia over Coax Alliance (MoCA), Ethernet, and/or DBS standards.

Similarly, an antenna assembly 108 may be utilized (e.g., being installed on the roof of the premises 101) to enable non-satellite based communications (e.g., reception of terrestrial TV broadcasts). In this regard, a plurality of terrestrial TV head-ends 140 may be utilized to communicate terrestrial TV signals 142 (which may typically comprise only downlink communication signals, but the disclosure is not so limited). The terrestrial TV signals 142 may be utilized to carry broadcast terrestrial TV content. The terrestrial TV signals 142 may comprise, for example, UHF or VHF band signals, which may typically be allocated for use in terrestrial televisions broadcasts, modulated in accordance with particular analog or digital standards. Examples of television modulation/transmission standards comprise NTSC, PAL or SECAM for analog television, and ATSC or DVB standards for digital television. The disclosure, however, is not limited to any particular standard/bands for terrestrial TV signals.

The antenna assembly 108 may comprise one or more antennas (e.g., dipole and/or loop antennas) that may be configured to receive RF signals corresponding to terrestrial broadcasts (e.g., UHF or VHF band signals). In some instances, the antenna assembly 108 may be configured to support diversity reception. In this regard, in diversity reception schemes, two or more antennas may be used, to improve the quality and reliability of signal reception (e.g., allowing for reception of different instances or copies of the target signal). Use of diversity reception may be particularly desirable in certain environments, especially in urban and indoor environments, where there may be no clear line-of-sight (LOS) between transmitter and receiver, and the transmitted signal may instead be reflected along multiple paths before finally being received. In some instances, the antenna assembly 108 may comprise, in addition to the actual antennas used in receiving the over-the-air signals, circuitry for performing at least a portion of the required processing of received terrestrial TV signals (including, in some instances, recovering data carried in the signals—e.g., television channels, media content, etc.), and/or to configure an output corresponding to the recovered data that may be suitable for transmission to other devices that may handle use and/or distribution of the data (e.g., to the gateway 102, via link 109). In this regard, the link 109 may comprise one or more wired, wireless, and/or optical links. The link 109 may comprise, for example, a coaxial and/or twisted-pair cable.

The gateway 102 may be operable to receive signals communicated from external entities (e.g., cable head-ends 120, satellites 130, or terrestrial TV head-ends 140), and process the signals as necessary for obtaining data and outputting the data via corresponding signals over the internal links $103_1$-$103_N$ to the client devices $104_1$-$104_N$, respectively. Similarly, the gateway 102 may be operable to receive signals communicated from the client devices $104_1$, over the internal links $103_1$, and process the signals as necessary for obtaining data and outputting the data via corresponding signals to the external entities. Accordingly, the term "gateway" in this disclosure refers to a client device which may perform satellite set-top box functions, cable television receiver functions, terrestrial television receiver functions, WAN/LAN modem functions, etc. In this regard, "satellite set-top box" functions may comprise functions utilized for delivering data from the cable head-ends, satellites, broadband head-ends, web servers, and the like to devices within the premises.

In operation, the in-premises network 100 may be setup and/or used to provide various services (e.g., broadband and/or television access) within the premises 101. In this regard, the in-premises network 100 may comprise a network configured based on one or more type(s) of interface(s) or standard(s), to interconnect various devices (e.g., the gateway 102 and client devices $104_1$-$104_N$) within a physical space (e.g., the premises 101), to allow connectivity therebetween and/or to access networks (i.e., external to the premises 101). The in-premises network 100 may be setup as Internet Protocol (IP) based network, using WiFi, Ethernet, Bluetooth, and/or similar connections, and may be configured to support various IP-based services such as broadband or IP-based TV (IPTV) services. The disclosure, however, is not so limited.

In some instances, at least some of the data utilized in the in-premises network 100 may be received from external sources, such as from broadband or broadcast sources (e.g., the satellites 130, the terrestrial TV head-ends 140 and/or the cable head-ends 120). In this regard, the gateway 102 may be utilized to service the in-premises network 100, such as by providing to the client devices $104_1$-$104_N$ access to external networks/connections. In such instances, the gateway 102 may facilitate communication of signals between the client devices $104_1$-$104_N$ and the external sources. For example, the gateway 102 may be utilized to route communications between cable head-ends 120 and one or more of client devices $104_1$-$104_N$. In this regard, a client device $104_1$ may receive from the cable head-end 120 streams containing, e.g., multimedia content. In some instance, the interactions with the cable head-end may be bi-directional. For example, client device $104_1$ may transmit to the cable head-end 120 signals or streams, such as containing user commands or requests (e.g., for particular content) or the like. Communications between client devices and head-ends may be configured in accordance with particular protocols. For example, cable communications may be configured in accordance with DOCSIS protocol(s).

Figure 2:
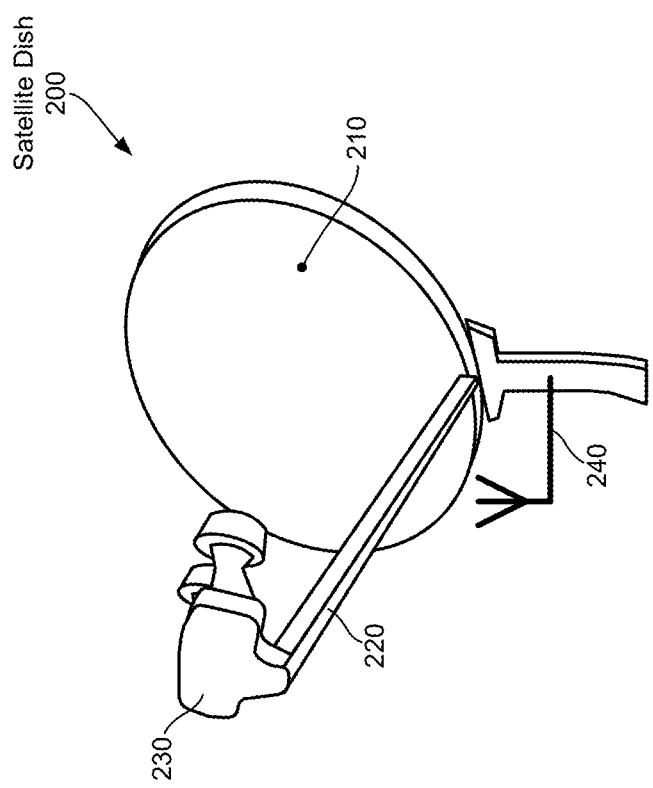
FIG. 2 is a diagram that illustrates an exemplary satellite receiver assembly that supports reception of non-satellite broadcasts, in accordance with an exemplary embodiment of the disclosure.

FIG. 2 is a diagram that illustrates an exemplary satellite receiver assembly that supports reception of non-satellite broadcasts, in accordance with an exemplary embodiment of the disclosure. Referring to FIG. 2, there is shown a satellite receiver (or "dish") assembly 200.

The satellite dish assembly 200 may be configured to support capturing of satellite signals, and handling of the received signals (e.g., to provide feed(s) to other devices, such as satellite set-top boxes or other devices that can extract and process satellite content). The satellite dish assembly 200 may be similar to the satellite reception assembly 106 of FIG. 1, for example. The satellite dish assembly 200 may comprise a reflector 210, a boom 220, and a signal processing assembly 230. In this regard, the reflector 210 may be a concave structure for reflecting electromagnetic waves (e.g., satellite signals) toward a focal point. The reflector 210 may be substantially parabolic in shape and may be made of, for example, fiberglass and/or metal. The boom 220 may be configured such that the signal processing assembly 230 to be mounted or placed at or near the focal point of the reflector 210, to ensure optimal capturing of satellite signals via the reflector 210. The signal processing assembly 230 may comprise circuitry for receiving and processing satellite signals. The signal processing assembly 230 may comprise circuitry for implementing a low-noise block downconversion (LNB) function. Furthermore, although the signal processing assembly 230 may be colloquially referred to as a "low-noise block downconverter" or "LNB," in various example implementations it may comprise circuitry operable to perform functions beyond block downconversion of received satellite signals. In the depicted implementation, the signal processing assembly 230 is shown as a single physical assembly mounted to the satellite dish assembly (i.e., it is a subassembly of the satellite dish assembly). In other implementations, however, the signal processing assembly 230 may comprise multiple physical assemblies, one or more of which may reside physically separate from the satellite dish assembly and be connected to the satellite dish via one or more wired and/or wireless links.

In some instances, the satellite dish assembly 200 may be configured to support reception and/or handling of other, non-satellite signals, which may carry non-satellite content. For example, the satellite dish assembly 200 may be configured to support reception and/or handling of terrestrial signal/content. In this regard, the satellite dish assembly 200 may comprise, for example, an antenna component 240 that is configured to receive signals in the bands typically utilized for particular, non-satellite broadcast or communication. The antenna component may be configured to perform at least some of the functions described with regard to the antenna assembly 108 of FIG. 1. In this regard, the antenna component 240 may comprise one or more antennas that may be configured to receive RF signals corresponding to terrestrial broadcasts (e.g., UHF or VHF bands). Furthermore, the antenna component 240 may be configured, in some instances, to support diversity reception.

In some example implementations, the satellite dish assembly 200 may be configured to support combining of satellite and non-satellite content. For example, satellite signals (or satellite content extracted therefrom) captured using the reflector 210 and terrestrial signals (or satellite content extracted therefrom) captured via the antenna component 240 may be processed via the signal processing assembly 230 such that feeds generated by the signal processing assembly 230 may combine satellite content and non-satellite (e.g., terrestrial) content—i.e., a single output signal may carry both satellite and non-satellite (e.g., terrestrial) content. In some instances, satellite and non-satellite content may be combined by stacking them in the corresponding output signal. An example of a signal processing/combining system which may correspond to the signal processing assembly 230 is described with respect to FIG. 3.

Figure 3:
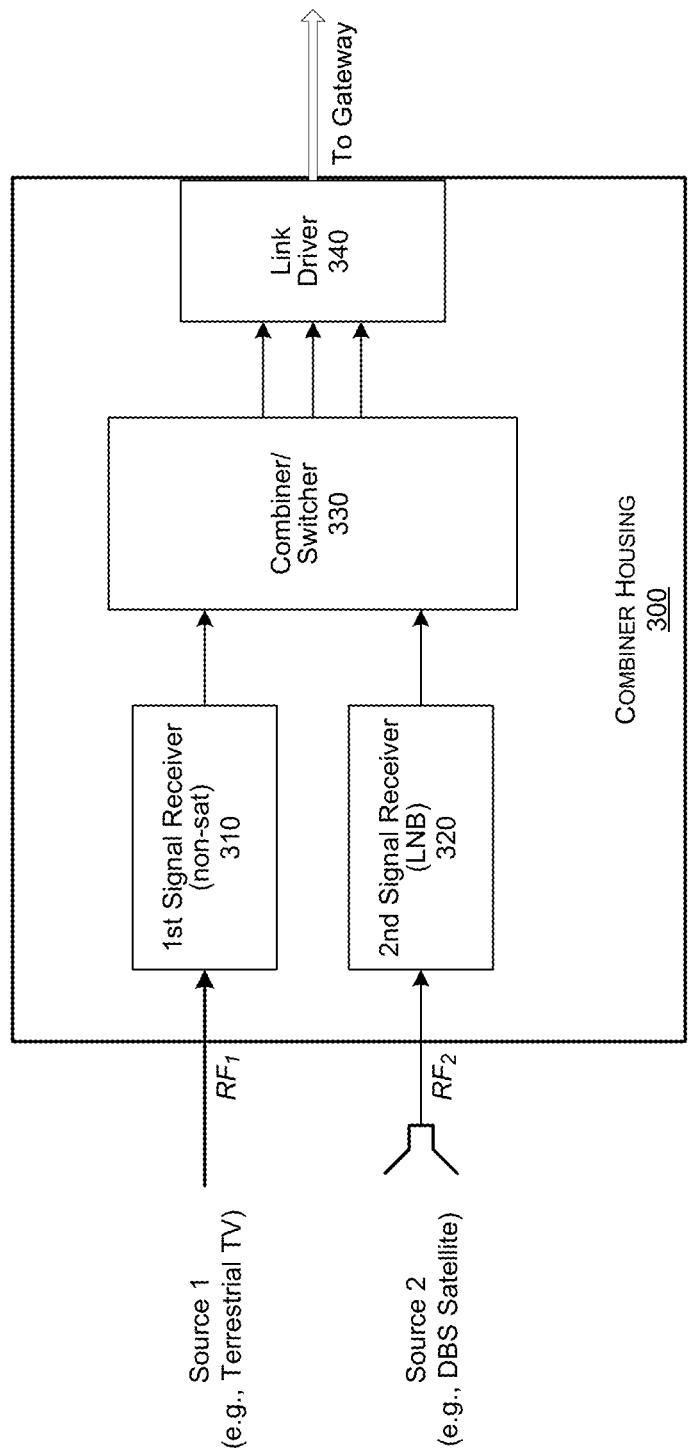
FIG. 3 is a diagram that illustrates an exemplary housing component of a satellite television receiver assembly that may support integrated stacking, in accordance with an exemplary embodiment of the disclosure.

FIG. 3 is a diagram that illustrates an exemplary housing component of a satellite television receiver assembly that may support integrated stacking, in accordance with an exemplary embodiment of the disclosure. Referring to FIG. 3, there is shown the signal combiner housing (or simply housing) 300. In this regard, the combiner housing 300 may correspond to the signal processing assembly 230 (or a portion thereof) of the satellite dish assembly 200 of FIG. 2.

The combiner housing 300 may comprise suitable circuitry, interfaces, logic, and/or code for processing signals obtained from a plurality of sources, and for combining at least portion of content carried thereby. In this regard, the signal sources may comprise, for example, satellite and/or terrestrial head-ends. In some instances, the combiner housing 300 be configured to support use of integrated stacking during combining of signals, for example to enable channel and/or band stacking, to facilitate combining contents corresponding to multiple feeds. For example, the combiner housing 300 may comprise a first signal receiver 310, a second signal receiver 320, a combiner 330, and a link driver 340.

The first signal receiver 310 may be configured to receive and process non-satellite signals. In this regard, the signal receiver 310 may comprise circuitry operable to receive and process non-satellite broadcast (RF) signals. For example, the first signal receiver 310 may be configured to receive terrestrial TV signals, which may be captured using a suitable antenna(s) assembly. In this regard, the first signal receiver 310 may be configured to perform such functions as amplification, filtering, and downconverting on a particular received RF (terrestrial) signals, to enable generating corresponding IF signals, and/or to perform additional functions that enable extraction of content (e.g., demodulation, diversity combining, etc.).

The second signal receiver 320 may be configured to receive and process satellite signals. In this regard, the second signal receiver 320 may comprise a low-noise block downconverter (LNB), and may comprise circuitry operable to receive and process RF satellite signals, which may be captured via a reflector of a satellite reception assembly. For example, the second signals 320 may be configured to perform such functions as low-noise amplification, filtering, and downconverting on particular received RF (satellite) signals, to enable generating corresponding IF signals. The IF signals may be in, for example, the L-band, half-L-band (950-1450 MHz), extended-L-band (250-2150 MHz, 300-2350 MHz), and the like. The disclosure, however, is not so limited, and the IF signals may span any suitable frequency range. In some instances, the combiner housing 300 may be configured to support reception of multiple satellite signals, and may correspondingly utilize a plurality of LNBs to allow receiving a plurality of satellite (RF) signals, each of which corresponding to a unique/distinct satellite signal, with the signals differing, for example, based on the source or the polarization.

The combiner 330 may comprise suitable logic, circuitry, interfaces and/or code that may be operable to process and combine signals corresponding to a plurality of received RF signals—e.g., outputs of the LNB 320 and the signal receiver 310. For example, the combiner 330 may be operable to amplify, downconvert, filter, and/or digitize at least a portion of the input signals. In some instances, the combiner 330 may be configured to support full spectrum capture—i.e., to capture an entire spectrum of each of one or more protocols of interest, which are concurrently digitized, or to only digitize a portion of the input signals, for example, depending on which channels (or sub-bands) in the signals are selected by client devices (e.g., which television channels are being consumed by the client devices). In some instances, the combiner 330 may be configured to support integrated stacking, whereby portions (e.g., channels or sub-bands) of input signals may be combined into a single output. Once the processing of the input signals (or portions thereof) is complete, the combiner 330 may be operable to recover information carried in the signals (e.g., one or more channels contained therein), and may generate output signals carrying the recovered information. The output signals may be sent to the link driver 340, for transmission thereby (e.g., to the gateway). In some instances, the output signals may be processed in the combiner 330 before being forwarded to the link driver 340. For example, the combiner 330 may be operable to convert to analog, upconvert, filter, and/or amplify the output signals.

The link driver 340 may be operable to process signals generated via the combiner 330 (e.g., comprising recovered information) and generate signals that may be transmitted onto a link to a corresponding link-peer device, such as a gateway/STB (e.g., antenna assembly 108 to gateway 102 of FIG. 1) in a format supported by the link-peer device. For example, the link driver 340 may be operable to packetize and transmit data received via signals $RF_1$-$RF_N$, (N=2 as shown but may be greater than 2). In accordance with one or more networking standards (e.g., Ethernet, Multimedia over Coax Alliance (MoCA), DOCSIS, and the like) to a link-peer device that receives satellite data using such standards. Additionally, or alternatively, the link driver 340 may be operable to perform operations (e.g., digital to analog conversion, modulation, frequency conversion, etc.) for outputting the data according to one or more multimedia standards (e.g., ATSC, DVB-S, ISDB-S, and the like) to enable receiving satellite data by devices using such standards. The output of the link driver 340 may comprise a plurality of IF signals, in a particular range to which the link-peer device (gateway/STB) may tune. For example, each of the IF signals may be in the L-band (950 MHz to 2150 MHz).

In operation, the combiner housing 300 may be configured to support combining content from different sources, particularly satellite and non-satellite content. For example, the satellite signals may be received and processed via the LNB 320 whereas non-satellite (e.g., terrestrial) signals may be received and processed via the first signal receiver 310. The combiner 330 may then be utilized to combine content from the satellite and non-satellite signals. In some instances, the combining performed by the combiner 330 may comprise combining content into a single output (e.g., IF) signals. This may be achieved by converting the content corresponding to one of the sources to appear as content obtained from signals received from the other source. For example, non-satellite (e.g., terrestrial) signals, which may typically correspond to bands different than satellite signal bands, may be processed such that content obtained therefrom (e.g., corresponding to particular channels or sub-bands) may be converted to appear as satellite content. This may comprise demodulating the non-satellite signals and then remodulating them based on a supported satellite standard. Example implementations for processing signals from different sources, to combine them into single output, are provided in FIGS. 4A and 4B.

In an example implementation, the housing 300 may be configured to handle and/or support use of channel stacking and/or band stacking, such as during combining of satellite and non-satellite contents. For example, the LNB 320, the first signal receiver 310, the combiner 330, and the link driver 340 may be implemented using integrated stacking based architectures. In this regard, integrated stacking based architectures may comprise, for example, filters that may be configured to filter through particular portions (e.g., corresponding to particular channels or sub-bands) in received signals. The integrated stacking based architectures may also comprise use of a multiple-input-multiple-output crossbar (Xbar). In this regard, the Xbar may be configured such that one or more inputs (comprising particular channels or sub-bands) may be combined and mapped to one or more outputs. An example implementation for a stacking architecture is provided in FIG. 6.

Figure 4A:
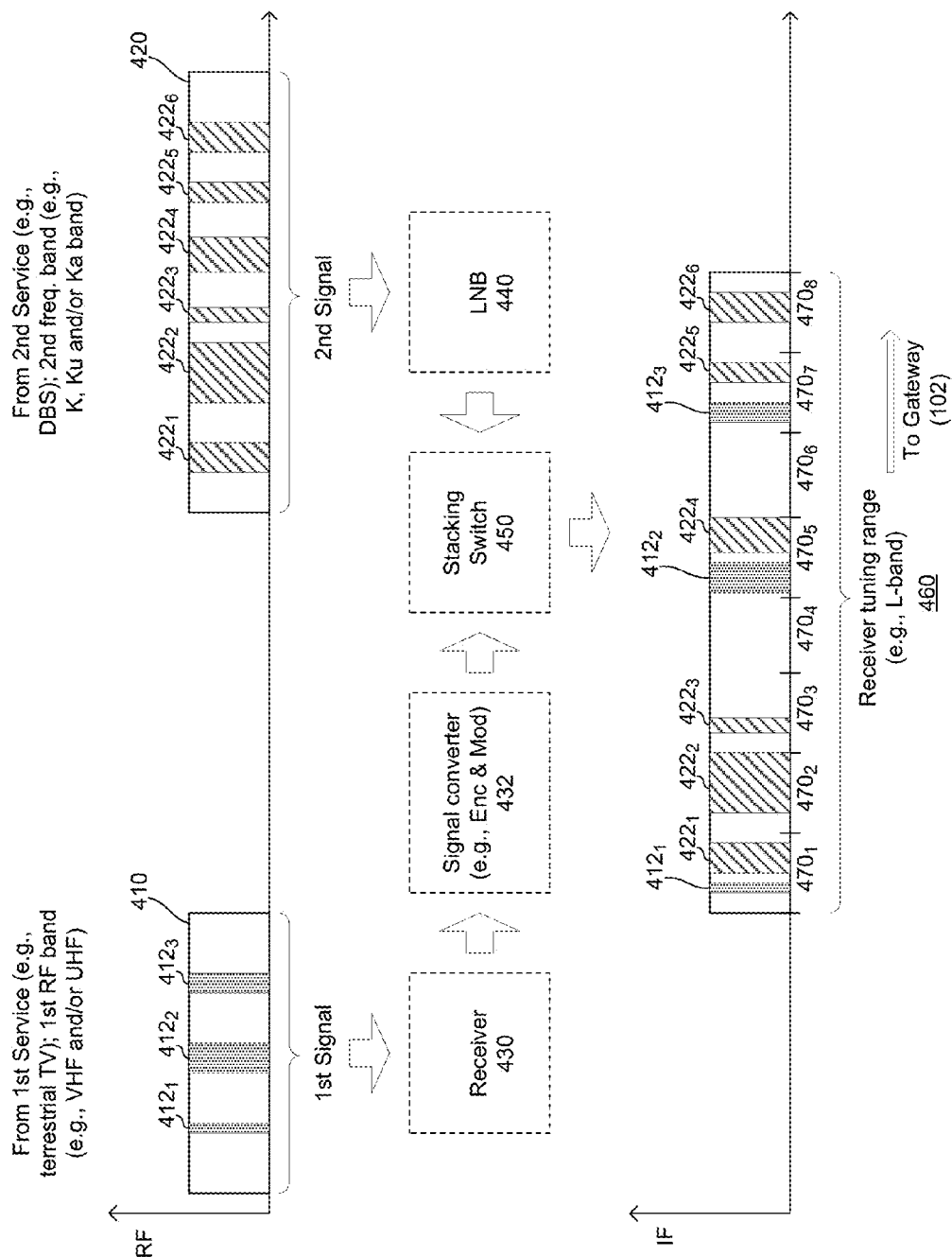
FIGS. 4A and 4B are diagrams that illustrate exemplary stacking schemes that may be implemented by a system configured to support use of integrated stacking while combining satellite content and non-satellite content onto a single physical channel for conveyance to a gateway/set-top box (STB), in accordance with an exemplary embodiment of the disclosure.
Figure 4B:
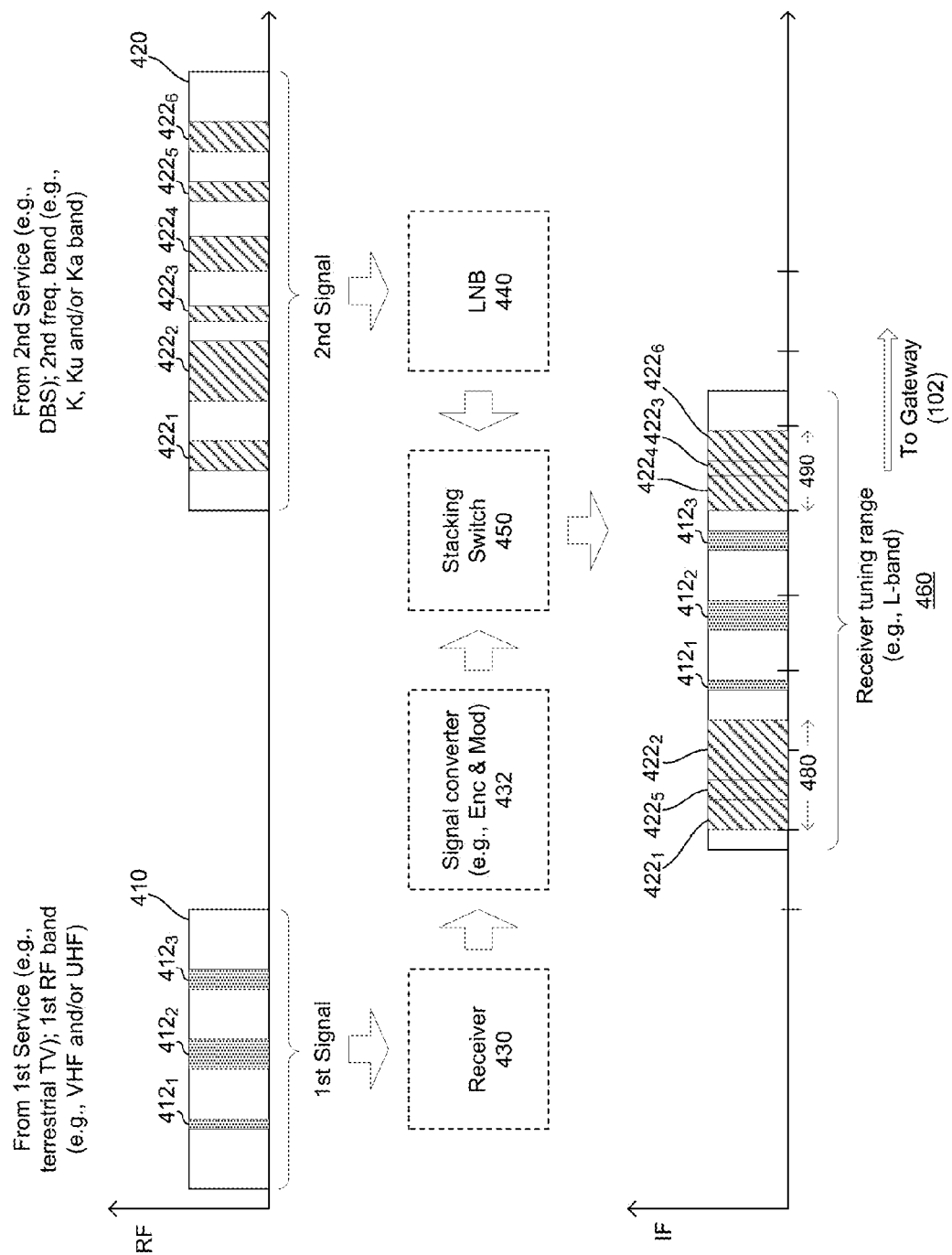

FIGS. 4A and 4B are diagrams that illustrate exemplary stacking schemes that may be implemented by a system configured to support use of integrated stacking while combining satellite content and non-satellite content onto a single physical channel for conveyance to a gateway/set-top box (STB), in accordance with an exemplary embodiment of the disclosure. Referring to FIGS. 4A and 4B, there is shown a processing path comprising a receiver 430, a signal convertor 432, a low-noise block downconverter (LNB) 440, and a stacking switch 450. The receiver 430 and the LNB 440 may be substantially similar to the first receiver 310 and the second receiver 320, respectively, of FIG. 3, for example. The signal convertor 432 may comprise circuitry configurable to convert signals (e.g., IF signals obtained from received RF signals) to match a particular standard and/or interface. For example, the signal convertor 432 may comprise an encoder/modulator circuitry for converting IF signals corresponding to non-satellite (e.g., terrestrial) signals to appear as satellite based IF signals. The stacking switch 450 may comprise circuitry configurable to combine multiple received signals (or portions thereof) onto a single channel. The signal convertor 432 and/or the stacking switch 450 may correspond to (at least a portion of) the combiner/switch 330 (and, in some instances, at least a portion of the link driver 340) of FIG. 3, for example.

In operation, the processing path comprising the receiver 430, the signal convertor 432, the LNB 440, and the stacking switch 450 may be utilized to enable receiving multiple signals from different sources (e.g., satellite and non-satellite, such as terrestrial), and to combine content from the multiple received signals onto a single output physical channel—e.g., for conveyance to a gateway/set-top box (STB), such as the gateway 102 of FIG. 1 for example. For example, as shown in FIGS. 4A and 4B, the processing path may be configured to enable extracting particular channels (or sub-bands) from two distinct received radio frequency (RF) signals 410 and 420, and to combine/stack the extracted channels (or sub-bands) onto a single intermediate frequency (IF) signal. In this regard, the RF signal 410 may be associated with a first (non-satellite) service (e.g., terrestrial TV broadcast), occupying a first RF band (e.g., corresponding to VHF and/or UHF band) while the RF signal 420 may be associated with a second (satellite) service (e.g., DBS broadcast); occupying a second (and different) RF band, (e.g., corresponding to K, Ku, or Ka band).

During example handling, each of the received signals 410 and 420 may initially be processed, via the receiver 430 and the LNB 440, respectively. This processing may result in corresponding IF signals (not shown). After the received satellite signal (e.g., a DBS signal) 420 is processed via the LNB 440, the output of the LNB 440 is input to the stacking switch 450. The received terrestrial signal (e.g., an ATSC signal) 410 is processed via the receiver 430, and the output of receiver 430 is then input into the signal convertor (encoder/modulator) 432, where it may be converted to appear as satellite based, and the output of the encoder/modulator 430 is then input to the stacking switch 450.

The stacking switch 450 may be configured to combine contents (e.g., channels or sub-bands) of the signals 410 and 420, such as by stacking channels or bands within these signals onto a single output signal. For example, the stacking switch 450 may be configured to frequency division multiplex at least a portion of the received terrestrial signal 410 (e.g., portions $412_1$-$412_3$) and at least a portion of the received satellite signal 420 (e.g., portions $422_1$-$422_6$) onto a common frequency band 460, which is conveyed to a gateway/STB (e.g., the gateway 102) via one or more physical channels (e.g., one or more coaxial cables). In this regard, the common frequency band 460 may correspond to (or be part of) the tuning range of the gateway/STB. For example, the common frequency band 460 may encompass an L-band. The selected portions $412_1$-$412_3$ and $422_1$-$422_6$ may comprise, for example, television channels. Accordingly, since the gateway/STB is operable to tune to the common frequency band 460, the gateway/STB may be enabled to concurrently receive terrestrial content (e.g., TV channels) carried in the portions $412_1$-$412_3$ of the terrestrial signal 410 and satellite content (e.g., TV channels) carried in portions $422_1$-$422_6$ of the satellite signal 420. The selected portions $422_1$-$422_6$ of the satellite signals may comprise, for example, signals from satellite transponders transmitting content (e.g., television channels) that have been selected for consumption by the gateway/STB (e.g., as indicated to the LNB 440 and/or the stacking switch 450 utilizing DiSEqC connection, for example). The selected portions $412_1$-$412_3$ of the terrestrial signal may comprise, for example, most popular television channels, television channels that have been selected for consumption by the gateway/STB (e.g., as indicated to the receiver 430, encoder/modulator 432, and/or stacking switch 450 utilizing DiSEqC connection, for example), and/or signals which have sufficient SNR for reliable reception by the receiver 430.

The stacking switch 450 may be configured to implement different stacking schemes. For example, in the stacking scheme example shown in FIG. 4A, the selected portions $422_1$-$422_6$ of the satellite signal 420 are output into frequency sub-bands $470_1$-$470_8$ of the common frequency band 460 and the selected portions $412_1$-$412_3$ of the terrestrial signal 410 are output on frequency sub-bands between the sub-bands $422_1$-$422_6$ (e.g., in available space(s) within the frequency sub-bands $470_1$-$470_8$, and in-between the portions $422_1$-$422_6$), such that interference between and among the terrestrial content components and the satellite content components of band 460 is kept below a tolerance level. In the stacking scheme example shown in FIG. 4B, the selected portions $422_1$, $422_5$, and $422_2$ of the satellite signal 420 are output onto sub-band 480 of the common frequency band 460, and the selected portions $422_4$, $422_3$, and $422_6$ of the satellite signal 420 are output onto sub-band 490 of the common frequency band 460. The selected portions $412_1$-$412_3$ of the terrestrial signal 410 are output on a frequency sub-band between the sub-bands 480 and 490 such that interference between and among the terrestrial content components and the satellite content components of band 460 is kept below a tolerance level.

Figure 4C:
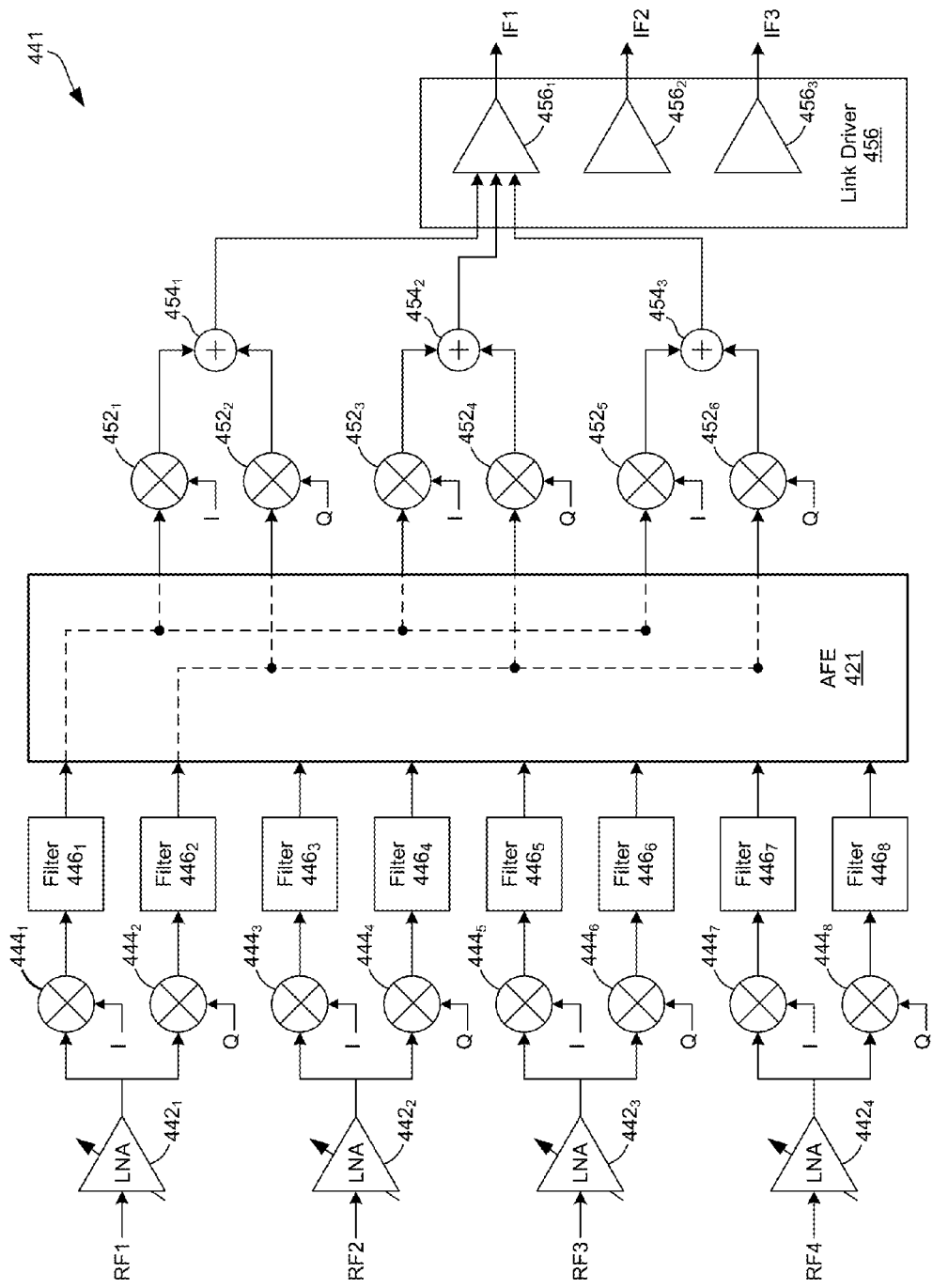
FIG. 4C is a diagram that illustrates an exemplary analog band stacking architecture for use in a system that supports integrated stacking, in accordance with an exemplary embodiment of the disclosure.

FIG. 4C is a diagram that illustrates an exemplary analog band stacking architecture for use in a system that supports integrated stacking, in accordance with an exemplary embodiment of the disclosure. Referring to FIG. 4C, there is shown a system 441, which may correspond to an analog band stack architecture that may support integrated stacking. In this regard, the system 441 may be utilized to provide integrated stacking when there may be no need for digitization.

The system 441 may comprise suitable circuitry, logic, code, and/or interfaces for performing and/or supporting analog based integrated stacking, to provide channel stacking and/or band stacking, such as during reception and/or processing of a plurality of input RF signals. The input RF signals may correspond to different satellite signals (i.e., originating from different sources and/or having different polarizations). The system 441 may be integrated into and/or may correspond to at least a portion of the processing circuit within the combiner housing 300, which is illustrated in FIG. 3. In this regard, system 441 may correspond to, for example, the first signal receiver 310, the second signal receiver 320, the combiner/switcher 330, and a link driver 340, which are illustrated in FIG. 3. The system 441 may alternatively correspond to only combiner/switcher 330 and the link driver 340 of FIG. 3, and the first signal receiver 310 and the second signal receiver 320 may be implemented with discrete components. As shown in FIG. 4C, the system 441 may be configured to support reception of 4 different RF signals, RF1-RF4. In this regard, the system 441 may comprise, for example, a plurality of low-noise amplifiers (LNAs) $442_1$-$442_4$, a plurality of input mixers $444_1$-$444_8$, a plurality of input filters $446_1$-$446_8$, an analog front end (AFE) 421, a plurality of output mixers $452_1$-$452_6$, a plurality of adders $454_1$-$454_3$, and a link driver 456. The link driver 456 may comprise a plurality of drivers $456_1$-$456_3$, which may comprise, for example, one or more power amplifiers.

The AFE 421 may comprise suitable circuitry, logic interfaces and/or code that may be operable to perform various signal processing functions, such as I/O calibration, equalization, channelization, or the like. In an example implementation, the AFE 421 may also be configured to function as multiple input/multiple output switching crossbar (Xbar), whereby one or more inputs may be processed, combined and/or mapped to one or more outputs. Each LNA $442_1$ may be operable to amplifying weak signals, particularly signals captured over a wireless interface (e.g., satellite signals). Each input mixer $444_1$ may be operable to multiply a plurality of signals. For example, a pair of mixers may be used to apply in-phase and quadrature signals (i.e., signals that would allow extraction of in-phase and quadrature components) to each amplified input signal ($RF_1$), such as to allow IQ calibration. The output mixers $452_1$-$452_6$ may be substantially similar to input mixers $444_1$-$444_8$, and may be utilized, in a similar manner, to apply in-phase and quadrature signals to the outputs of the AFE 421 (to generate the in-phase and quadrature components). Each of the adders $454_1$ may be operable to combine (add and/or subtract) a plurality of signals. For example, each of the adders $454_1$-$454_3$ may be utilized to combine (add or subtract) the in-phase and quadrature components corresponding to an output of the AFE 421. The input filters $446_1$-$446_8$ may be operable to filter signals (e.g., outputs of the mixers $444_1$-$444_8$), based on one or more criteria. For example, the input filters $446_1$-$446_8$ may be configured as low-pass filters (LPFs), which may be operable to pass low-frequency signals (below particular threshold, or a "cutoff frequency") and to attenuate signals with frequencies higher than the cutoff frequency.

In operation, the AFE 421 may be operable to provide crossbar (Xbar) switching between multiple inputs and multiple outputs, such as in accordance with integrating stacking (for channels and/or band stacking). In this regard, the AFE 421 may comprise X (an integer number) inputs and Y (an integer number) outputs, and may provide channel and/or band stacking by combining one or more inputs, which may have been processed to comprise particular channels or bands, into one or more outputs. The number of inputs, X, may depend on the number of system inputs (i.e., the number of input RF signals). For example, when configured to extract I/O components, the number of inputs, X, may represent double the number of different feeds or RF signals supported—e.g., when there are 4 different RF inputs, X is 8, corresponding to outputs of the input filters (e.g., input filters $446_1$-$446_8$). The number of outputs, Y, may depend on the system output and/or particular characteristics thereof (e.g., total number of distinct frequencies or frequency bands that may be in the system output). For example, the number of outputs, Y, may be set to double the number of bands in the output (as a whole, or a particular IF signal therein). Thus, as shown in FIG. 4C, Y may be 6. Thus, the AFE 421 may be configured to provide particular mapping between the X inputs and the Y outputs, in accordance with an applicable scheme (e.g., an integrated stacking scheme). The AFE 421 may also be operable to apply additional signal processing functions (e.g., I/O calibration, equalization, channelization, etc.). These functions, along with the additional adjustments or signal processing functions (e.g., filtering, amplification, downconversion, upconversion, etc.), which may be applied to the inputs and/or outputs of the AFE 421, may be configured in an adaptive manner. In this regard, the components and/or functions of the AFE 421 (and/or components used in the overall path that includes the AFE 421) may be configured to provide the desired channel and/or band stacking, and/or to generate outputs at different frequencies such that they can be combined onto one or more physical channels (e.g., a coaxial cable), corresponding to the plurality of link drivers $456_1$-$456_3$ for example, to enable conveyance to the gateway/STB for example.

The architecture implemented in system 441 may be operable to provide analog band stacking without analog-to-digital conversion. In this regard, band stacking may not necessarily need sharp digital channel selection, and as such the stacking may be performed without the need for analog-to-digital conversions (and thus, the need for subsequent digital-to-analog conversions). In this regard, the system 441 may be configured for low power transmission, being implemented without power-consuming analog-to-digital convertors (ADCs) and/or digital-to-analog convertors (DACs). The system 441 may be implemented, for example, utilizing a Weaver down-up image-reject architecture. For example, the output mixers $452_1$-$452_6$ may be configured to provide harmonic rejection upconversion, such as to avoid aliasing. The selection of inputs may be accomplished by the crossbar switch (Xbar) of the AFE 421. The selection of a lower/upper sideband may be accomplished by upconversion mixer(s). In some instances, the system 441 may be configured not to perform digital I/O calibration. For example, the system 441 may be configured to operate at about 50 dB (e.g., comprising SNR required 11 dB, noise 11 dB, 28 dB D/U). The I/O accuracy may be enhanced by utilizing double-quadrature. In an example embodiment of the disclosure, the sum and difference between the upconverted frequency and the intermediate frequency (IF), for example of 350 MHz (right after downconversion), may be present at the IF output. In this regard, the system 441 may be configured not to filter out an unwanted band since it may be only 200 MHz, for example, away from the wanted band. The unwanted band may be reduced or removed by sharpening the input filters $446_1$-$446_8$, after downconversion, and/or by adding, for example, 4 more front-ends and placing an LO at the center of the desired band.

Figure 5A:
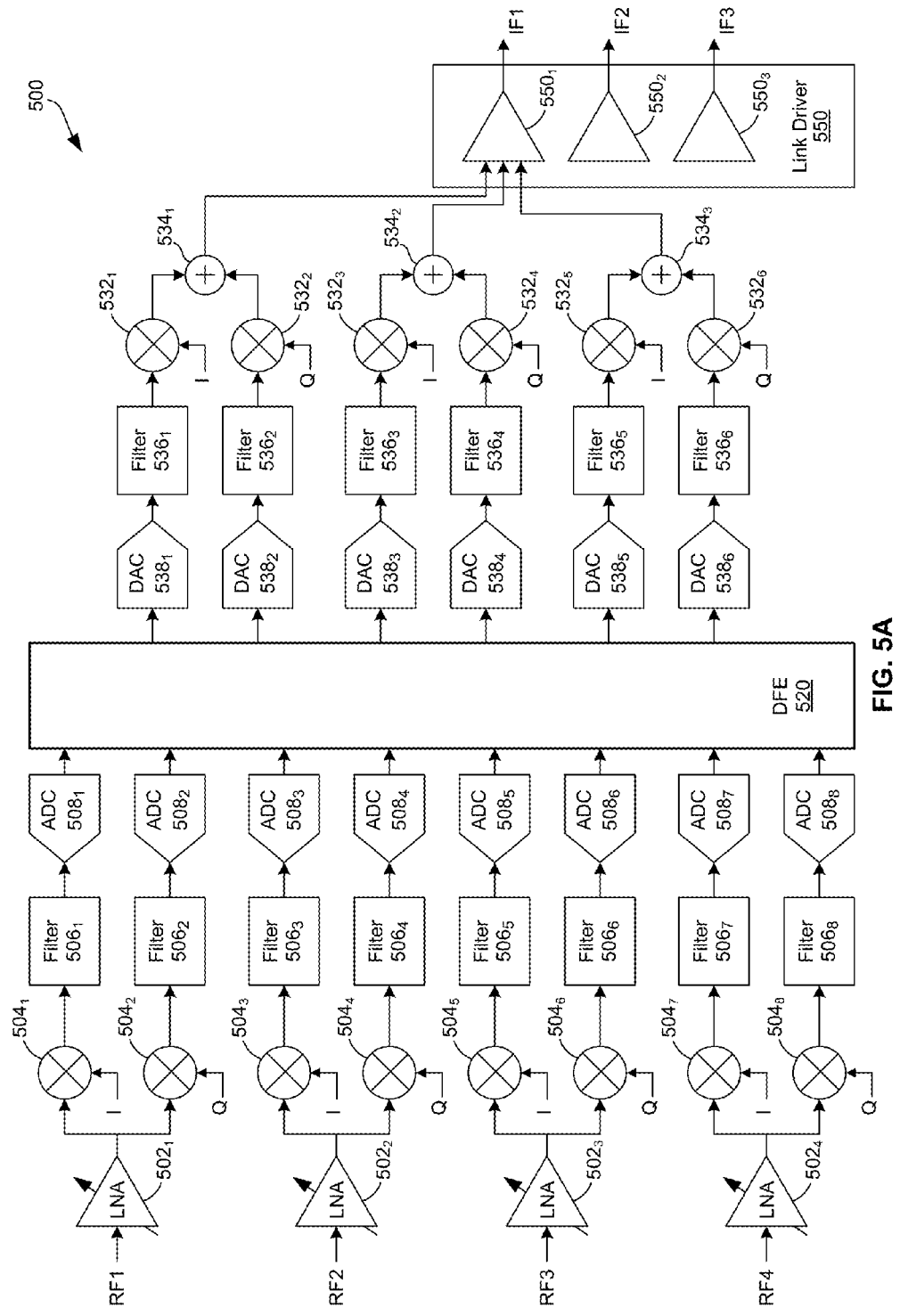
FIG. 5A is a diagram that illustrates an exemplary digital band stacking architecture for use in a system that supports integrated stacking, in accordance with an exemplary embodiment of the disclosure.

FIG. 5A is a diagram that illustrates an exemplary digital band and/or channel stacking architecture for use in a system that supports integrated stacking, in accordance with an exemplary embodiment of the disclosure. Referring to FIG. 5A, there is shown a system 500, which may correspond to a digital band stack architecture that may support integrated stacking.

The system 500 may comprise suitable circuitry, logic, code, and/or interfaces for performing and/or supporting digital based integrated stacking, to provide channel stacking and/or band stacking, such as during reception and/or processing of a plurality of input RF signals. The input RF signals may correspond to different satellite signals (i.e., originating from different sources and/or having different polarizations). The system 500 may be integrated into and/or may correspond to at least a portion of the processing circuitry within the combiner housing 300, which is illustrated in FIG. 3. In this regard, system 500 may correspond to, for example, the first signal receiver 310, the second signal receiver 320, the combiner/switcher 330, and a link driver 340, which are illustrated in FIG. 3. The system 500 may alternatively correspond to only combiner/switcher 330 and the link driver 340, and the first signal receiver 310 and the second signal receiver 320 may be implemented with discrete components.

As shown in FIG. 5A, the system 500 may be configured to support reception of 4 different RF signals, RF1-RF4. In this regard, the system 500 may comprise, for example, a plurality of low-noise amplifiers (LNAs) $502_1$-$502_4$, a plurality of input mixers $504_1$-$504_8$, a plurality of input filters $506_1$-$506_8$, a plurality of analog-to-digital convertors (ADCs) $508_1$-$508_8$, a digital front end (DFE) 520, a plurality of digital-to-analog convertors (DACs) $538_1$-$538_6$, a plurality of output filters $536_1$-$536_6$, a plurality of output mixers $532_1$-$532_6$, a plurality of adders $534_1$-$534_3$, and a link driver 550, which may comprise a plurality of drivers $550_1$-$550_3$ (which may comprise, for example, power amplifiers).

The DFE 520 may be operable to perform various signal processing functions, such as I/O calibration, equalization, channelization, or the like. In an example implementation, the DFE 520 may also be configured to provide crossbar (Xbar) switching function crossbar, whereby one or more inputs of the DFE 520 are mapped to one or more outputs of the DFE 520. The LNAs $502_1$-$502_4$, the input mixers $504_1$-$504_8$, the input filters $506_1$-$506_8$, the output mixers $532_1$-$532_6$, and the adders $534_1$-$534_3$ may be substantially similar to corresponding elements/components in the system 441 of FIG. 4C, and may substantially operate in a similar manner. The output filters $536_1$-$536_6$ may be operable to filter input signals (e.g., outputs of the DACs $538_1$-$538_6$) based on one or more criteria. For example, the output filters $536_1$-$536_6$ may be configured as low-pass filters (LPFs). The ADCs $508_1$-$508_8$ may be operable to perform analog-to-digital conversions (e.g., on outputs of the input mixers $504_1$-$504_8$); whereas the DACs $538_1$-$538_6$ may be operable to perform digital-to-analog conversions (e.g., on outputs of the DFE 520).

In operation, the system 500 may be utilized to provide integrated stacking, substantially as shown in and described with respect to system 441 of FIG. 4C, for example. However, whereas the system 441 may enable implementing analog band stacking, the system 500 may be utilized to provide digital based integrated stacking, which may comprise digital band stacking that may be implemented with or without full spectrum capture. For example, the DFE 520 may be used to provide crossbar (Xbar) switching, between X (an integer number) inputs and Y (an integer number) outputs, and may provide channel and/or band stacking by combining one or more inputs, which may have been processed to comprise particular channels or bands, into one or more outputs. The DFE 520 may also apply additional signal processing functions (e.g., I/O calibration, equalization, channelization, etc.). These functions, along with the additional adjustments or signal processing functions (e.g., analog-to-digital conversions, digital-to-analog conversion, filtering, amplification, downconversion, upconversion, etc.), which may be applied to the inputs and/or outputs of the DFE 520, may be configured in an adaptive manner. In this regard, the components and/or functions of the DFE 520 (and/or components used in the overall path that includes the DFE 520) may be configured to provide the desired channel and/or band stacking, and/or to generate outputs at different frequencies such that they can be combined onto one or more physical channels (e.g., a coaxial cable), corresponding to the plurality of link drivers $550_1$-$550_3$ for example, to enable conveyance to the gateway/STB for example.

In an example implementation, the digital band stacking implemented via the system 500 may be configured to perform signal detection in the analog domain while performing digital I/O calibration in the digital domain. For example, I/O accuracy in the digital band stacking may be enhanced by utilizing double-quadrature conversion in the upconversion path to eliminate I/O calibration of the upconverter. In an example implementation, digital band stacking provided via the system 500 may support various security techniques, such as a one-time password (OTP) to secure the data. In another example implementation, digital band stacking may support channel filtering in the DFE 520, which may allow implementing channel stacking.

Figure 5B:
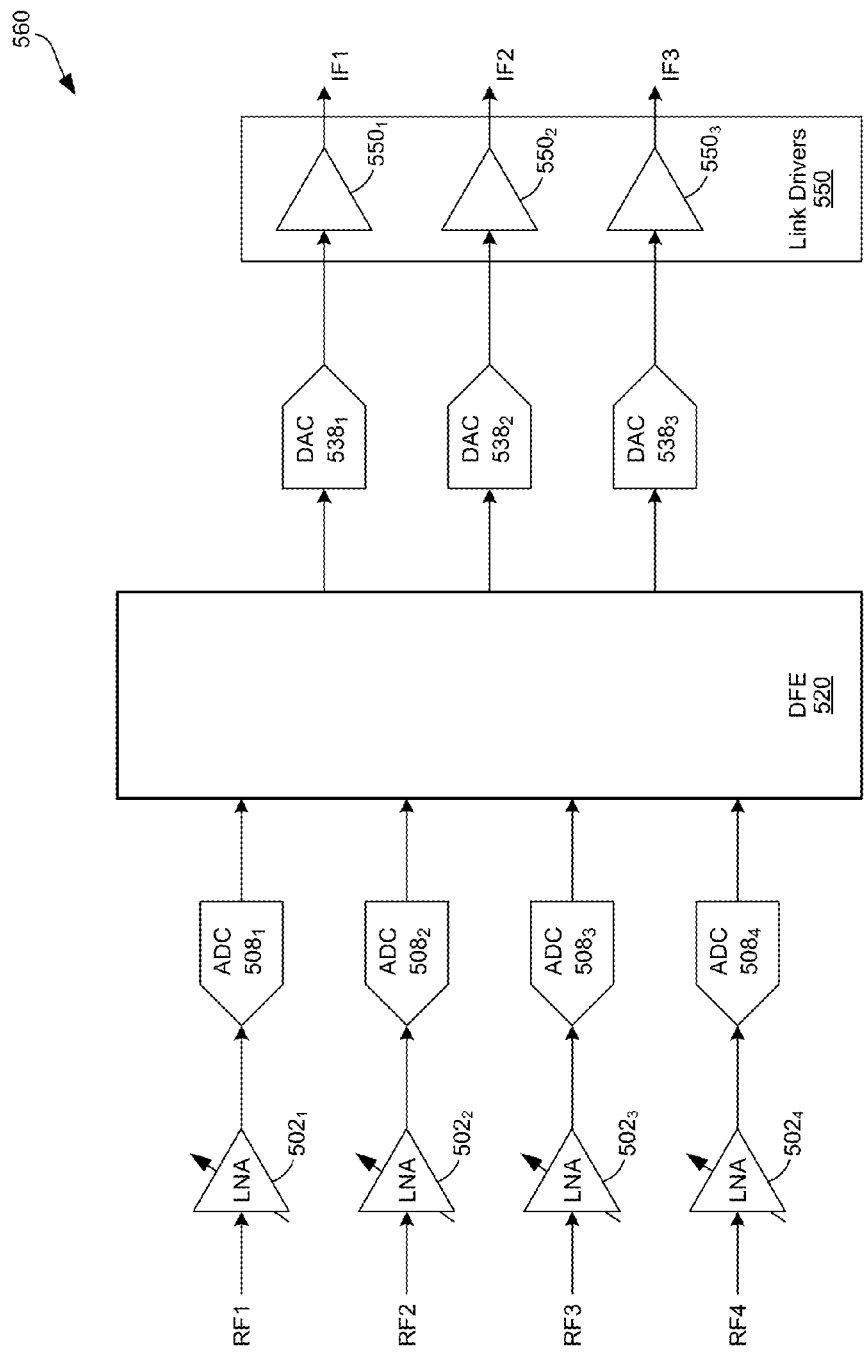
FIG. 5B is a diagram that illustrates an exemplary simplified digital band stacking architecture for use in a system that supports integrated stacking using full spectrum capture, in accordance with an exemplary embodiment of the disclosure.

FIG. 5B is a diagram that illustrates an exemplary simplified digital band stacking architecture for use in a system that supports integrated stacking using full spectrum capture, in accordance with an exemplary embodiment of the disclosure. Referring to FIG. 5B, there is shown a system 560, which may correspond to a simplified band stacking architecture for use in supporting integrated stacking using full spectrum capture.

The system 560 may comprise suitable circuitry, logic, code, and/or interfaces for performing and/or supporting digital based integrated stacking, to provide channel stacking and/or band stacking using full spectrum capture, such as during reception and/or processing of a plurality of input RF signals. In this regard, the system 560 may correspond to a simplified version of the system 500, with various components of the system 500 removed due to the configuration for full spectrum capture, with the remaining components (having the same reference numbers) being implemented and/or configured in a substantially similar manner as described with respect to system 500 of FIG. 5A. Accordingly, the overall operation of the system 560 may be substantially similar to the system 500, as described with respect to FIG. 5A, with the exception on the elimination of operations of any eliminated component(s), and/or any adjustments (e.g., to remaining components) that may be needed to account for the removal of the eliminated components (and their functions) and for the use of full spectrum capture.

For example, since the system 560 is configured to provide integrated stacking based on full spectrum capture, various components that are utilized in input paths to the DFE 520 may be eliminated (or disabled), since they may not be necessary when full spectrum captured is utilized. In this regard, input mixers $504_1$-$504_8$ and the input filters $506_1$-$506_8$ may be eliminated. Also, half of the input ADCs $508_1$-$508_8$ (e.g., ADCs $508_5$-$508_8$), since with 4 RF inputs (RF1-RF4), only four ADCs are needed because with the elimination of the mixers and filters, there would be no IQ signals. The remaining 4 ADCs $508_1$-$508_4$ may then be configured to capture the entire spectrum corresponding to the respective RF signals.

In some instances, various components that are utilized in the output paths from the DFE 520 may be eliminated (or disabled), since they may not be necessary when full spectrum captured is utilized. For example, the output filters $536_1$-$536_6$, the output mixers $532_1$-$532_6$, and the adders $534_1$-$534_3$ may be eliminated. Also, half of the DACs $538_1$-$538_6$, (e.g., DACs $538_4$-$538_6$) may be eliminated, since there would be no IQ signals, and only three DACs (e.g., DACs $538_1$-$538_3$) would be needed for the three IF drivers (drivers $550_1$-$550_3$). In this regard, full-spectrum capturing based integrated stacking may allow eliminating complex mixers or mixing schemes at the output side at the expense of the DACs being able and configured to handle the entire spectrum. While the full spectrum capture based architecture shown in FIG. 5B eliminates mixing (and related filtering and/or adding) at both of the input-side and the output-side, the disclosure is not so limited. In this regard, some implementations may incorporate less mixing complexity, with a combination of using mixing in front of (i.e. at the input-side of) the DFE 520 (i.e., resembling the input-side of system 500 of FIG. 5A) and full-spectrum DAC at the output, or vice versa.

Figure 6:
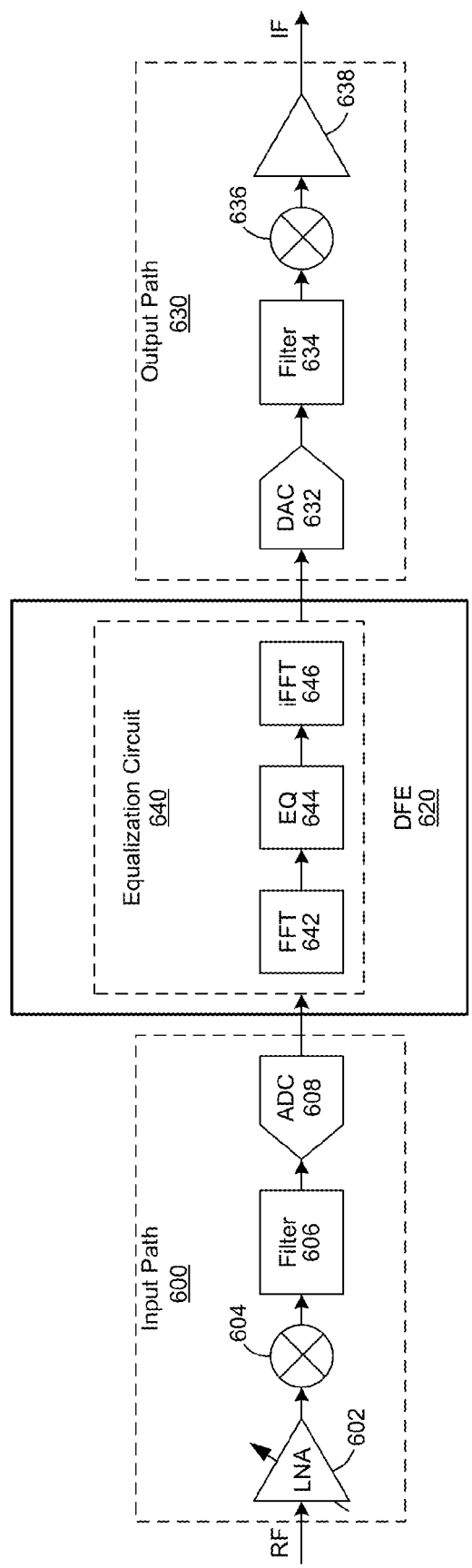
FIG. 6 is a diagram that illustrates an exemplary stacking with equalization for use in a system that supports integrated stacking, in accordance with an exemplary embodiment of the disclosure.

FIG. 6 is a diagram that illustrates an exemplary stacking with equalization for use in a system that supports integrated stacking, in accordance with an exemplary embodiment of the disclosure. Referring to FIG. 6, there is shown a digital front end (DFE) 620, which may comprise one or more equalization circuits 640 that may provide equalization (e.g., during baseband crossbar switching) between an input path 600 and an output path 630.

The DFE 620 may correspond to the DEF 420 or DFE 520 of FIGS. 4 and 5, respectively, for example. In this regard, as shown in FIG. 6, the DEF 620 may incorporate an equalization function, by use of equalization circuits 640, during integrated stacking (i.e., in the course of crossbar switching).

The input path 600 may comprise a low-noise amplifier (LNA) 602, a mixer 604, an input filter 606, and an analog-to-digital convertor (ADC) 608. In this regard, the input path 600 may correspond to, for example, one of the four input branches (corresponding to RF inputs RF1-RF4) of FIG. 5A. The output path 630 may comprise a digital-to-analog convertor (DAC) 632, an output filter 634, a mixer 636, and power amplifier (PA) 638. In this regard, the output path 600 may correspond to, for example, one of the three output branches of FIG. 5A.

Each equalization circuit 640 may comprise circuitry for channel equalization. For example, the equalization circuit 604 may comprise a Fast-Fourier-Transform (FFT) block 642, an equalization block 644, and an inverse Fast-Fourier-Transform (iFFT) block 646. In this regard, the FFT block 642 may be configured to convert time-domain discrete samples of a signal into their corresponding frequency-domain components. The equalization block 644 may be configured to equalize (i.e. adjust the balance between) the frequency components outputted by the FFT block 642. The iFFT block 646 may be configured to convert the frequency-domain components of a signal (after equalization) to its corresponding time-domain equivalent.

In operation, the equalization circuits 640 may be utilized to perform equalization, such as during integrated stacking processing (to provide channel and/or band stacking). In this regard, power may be equalized during stacking operations, such as to ensure that power may remain relatively flat (e.g., over an entire dynamic range). For example, a frequency band may be divided into frequency bins, and a weighting may be given to the frequencies in each of the frequency bins. The power equalization may then be provided over the frequency bins. In an example implementation, one or more suitable techniques (e.g., overlap and add technique) may be utilized to prevent leakage of power from one frequency bin into adjacent frequency bins across the entire band. In other words, equalization of the power may be provided across all the frequency bins so the power may be relatively flat across all of the frequency bins. Before the frequency bins are shifted, they may be equalized so that the power is more evenly distributed across all the frequency bins.

Figure 7:
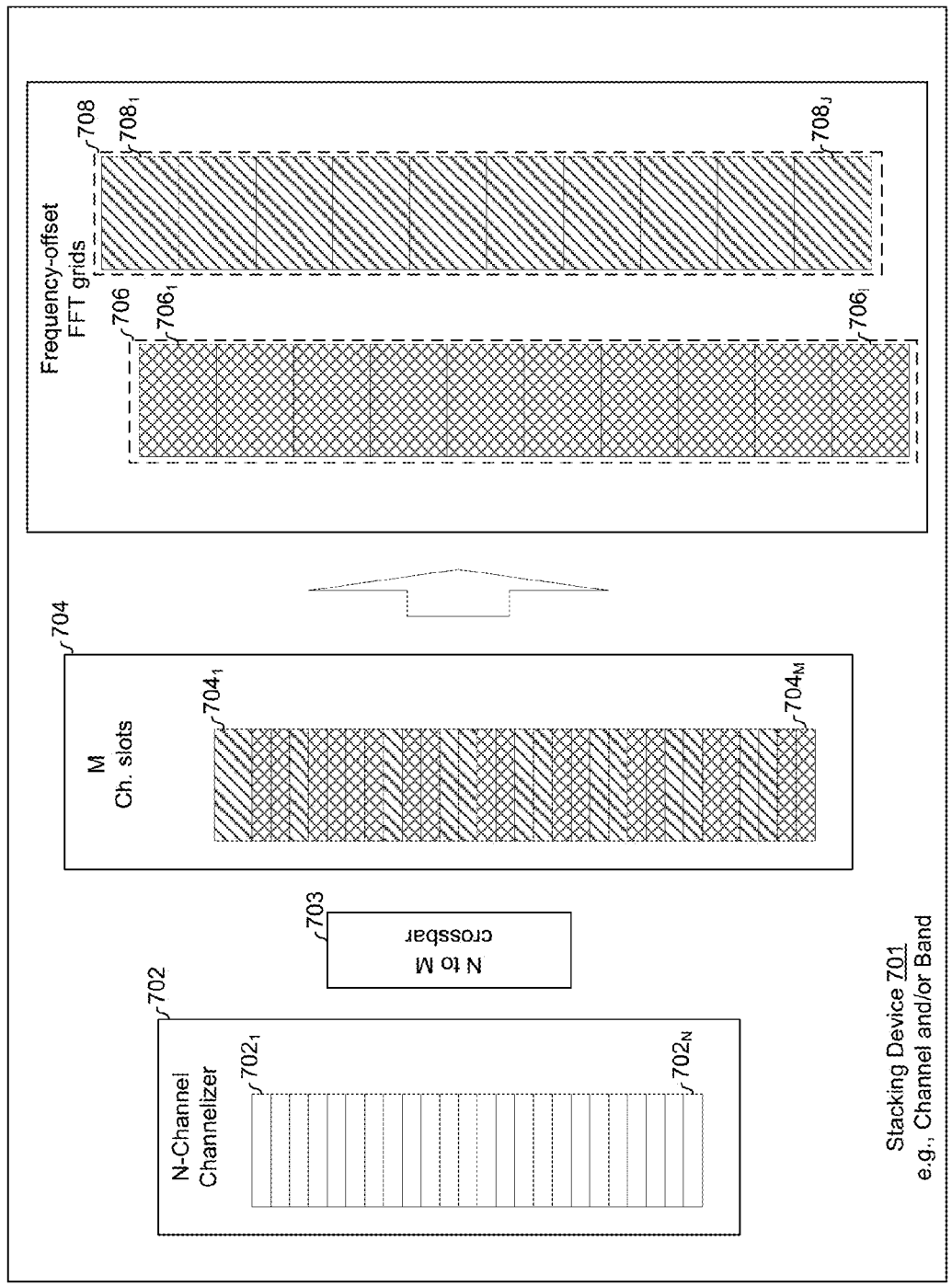
FIG. 7 is a diagram that illustrates an exemplary system that is operable to flexibly stack received channels of varying bandwidths, in accordance with an exemplary embodiment of the disclosure.

FIG. 7 is a diagram that illustrates an exemplary system that is operable to flexibly stack received channels of varying bandwidths, in accordance with an exemplary embodiment of the disclosure. Referring to FIG. 7, there is shown a stacking device 701, a channelizer 702, a crossbar 703, a plurality of M channel slots referenced as $704_1$, . . . , $704_M$ and a plurality of frequency-offset FFT grids 706, 708.

The stacking device 701 may comprise suitable logic, circuitry, interfaces and/or code that may be operable to provide channel stacking and/or band stacking. In this regard the stacking device 701 may be operable to stack a plurality of channels or a plurality of frequency sub-bands into one or more output signals. The bandwidth of the channels, frequency sub-bands, and/or output signals may vary. The stacking device 701 may be operable to stack a plurality of input channels onto one or more frequency bands for output onto a medium (e.g., for output onto a coaxial cable that goes to one or more set-top boxes). The stacking device 701 may, for example, reside outside a direct broadcast satellite (DBS) subscriber premises. The stacking device 701 may, for example, be mounted on the satellite reception assembly (the satellite "dish" (See FIG. 2)) along with a LNB and/or other circuitry.

The channelizer 702 may comprise suitable logic, circuitry, interfaces and/or code that may be operable to handle the processing of N channels. In this regard, the channelizer 702 may comprise an N-channel channelizer that may be operable to handle the processing of the N channels. In this regard, the channelizer 702 may be operable to isolate one or more portions of a plurality of received or input RF signals.

The crossbar 703 may comprise suitable logic, circuitry, interfaces and/or code that may be operable to map and/or combine the isolated one or more portions of the plurality of received or input RF signals. In this regard, the crossbar may be operable to map one or more of the N channels, namely $702_1, \ldots, 702_N$ to one or more of the M channel slots $704_1, \ldots, 704_M$. The crossbar 703 may comprise a multiple-input-multiple-output crossbar (Xbar), which may be configured such that one or more of N inputs comprising particular channels or frequency sub-bands may be combined and/or mapped to one or more of the M channel slots $704_1, \ldots, 704_M$. FIGS. 4A and 4B illustrate exemplary stacking of channel and/or frequency sub-bands.

The frequency offset FFT grid 706 may comprise a plurality of frequency bins $706_1, \ldots, 706_I$, and the frequency offset grid 708 may comprise a plurality of frequency bins $708_1, \ldots, 708_J$. The offset between the frequency bins in the frequency offset FFT grids 706, 708 may be selected to provide a particular overlap between the frequency bins. For example, the offset between the frequency bins may be selected so that the overlap may be at least 54 MHz.

The crossbar 703 may be operable to map one or more of the channels $702_1, \ldots, 702_N$, from the channelizer 702, to the slots via the crossbar based on one or more parameters comprising the value of N, which represents the bandwidth of the channels, the value of M, the number of FFT bins (i.e., the values of I and J), and the bandwidth into which the channels are to be stacked (i.e., I or J multiplied by the bandwidth of each FFT bin). The offset between the two FFT grids may also be determined based on any one or more of the above parameters. In an example implementation, the offset may be such that there is at least 54 MHz of overlap between the frequency bins $708_X$ and $706_X$, which are in the frequency-offset FFT grids 706, 708, where X is an integer between 1 and I and between 1 and J.

In an exemplary embodiment of the disclosure, the following parameters may have the following values: M=32; I=J=8; FFT bin bandwidth ($BW_{706}=BW_{708}$)=153 MHz; the frequency offset between the two grids is 76.5 MHz, and the slot to bin mapping may be as follows: slots 1 and 2 to bin $708_1$, slots 3 and 4 to bin $706_1$, slots 5 and 6 to bin $708_2$, slots 7 and 8 to bin $706_2$, and so on.

In an exemplary embodiment of the disclosure, N=16 and channel bandwidth ($BW_{702}$)=75 MHz, and the channels $702_1$-$702_N$ may be mapped to every other one of the slots $704_1$-$704_M$ (the pattern of used and unused slots, where 'x' represents a used slot and 'o' represents an unused slot may be: xoxox . . . ).

In an exemplary embodiment of the disclosure, N=24, $BW_{702}$=50 MHz, and the channels $702_1$-$702_N$ may be mapped to three of every four of slots $704_1$-$704_M$ (e.g., the pattern of used and unused slots, where 'x' represents a used slot and 'o' represents an unused slot may be: xxxo . . . ).

In an exemplary embodiment of the disclosure, N=20, $BW_{702}$=60 MHz, and the channels $702_1$-$702_N$ may be mapped to five of every eight of slots $704_1$-$704_M$ (e.g., the pattern of used and unused slots, where 'x' represents a used slot and 'o' represents an unused slot may be: xxoxxoxo . . . ).

Figure 8:
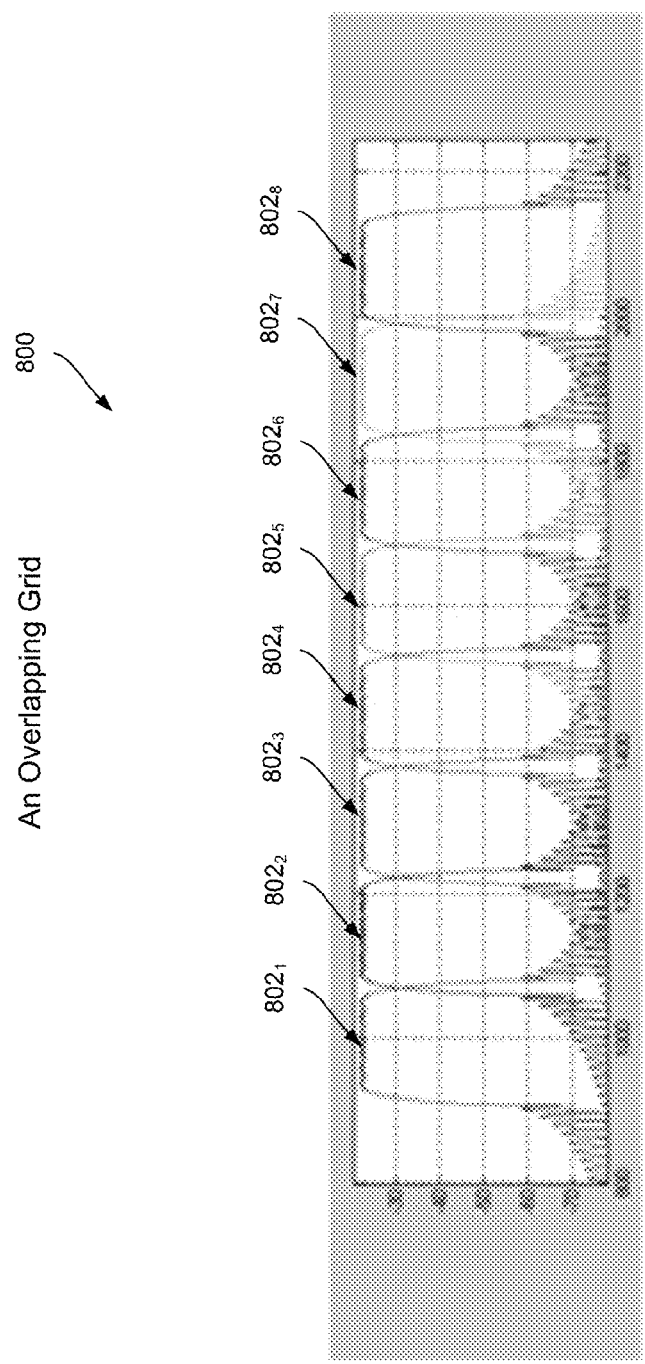
FIG. 8 is a diagram that illustrates an exemplary waveform of one of the overlapping FFT grids associated with flexibly stacked received channels of varying bandwidths, in accordance with an exemplary embodiment of the disclosure.

FIG. 8 is a diagram that illustrates an exemplary waveform of one of the overlapping FFT grids associated with flexibly stacked received channels of varying bandwidths, in accordance with an exemplary embodiment of the disclosure. Referring to FIG. 8, there are shown a frequency offset grid 800 comprising eight (8) frequency bins, namely, $802_1$, $802_2$, $802_3$, $802_4$, $802_5$, $802_6$, $802_7$, $802_8$. The spectrum into which the channels are stacked may comprise the L-band spectrum, which is typically utilized for DBS satellite reception assemblies to deliver received satellite signals to set-top boxes.

Figure 9:
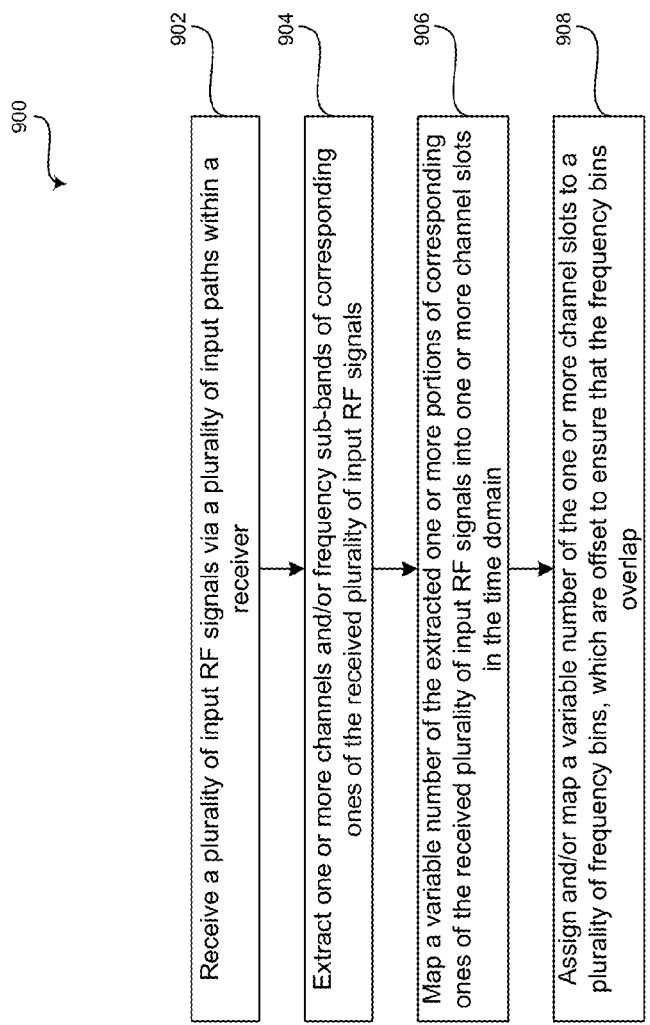
FIG. 9 is a flow chart illustrating exemplary steps for flexible channel and band stacking, in accordance with an exemplary embodiment of the disclosure.

FIG. 9 is a flow chart illustrating exemplary steps for flexible channel and band stacking, in accordance with an exemplary embodiment of the disclosure. Referring to FIG. 9, there is shown a flowchart 900 comprising exemplary steps 902 through 908. In step 902, a plurality of input RF signals are received via a plurality of input paths within a receiver. In step 904, one or more channels and/or frequency sub-bands of corresponding ones of the received plurality of input RF signal are extracted. In step 908, a variable number of the extracted one or more portions of corresponding ones of the received plurality of input RF signals are mapped into one or more channel slots in the time domain. In step 908, a variable number of the one or more channel slots are assigned and/or mapped to one or more frequency bins, which are offset to ensure that the frequency bins overlap.

In accordance with various embodiments of the disclosure, a receiver such as the satellite dish assembly 200 (FIG. 2) may comprise a plurality of input paths, which may be operable to receive and process a plurality of input RF signals. A combiner 330 (FIG. 3) comprising the plurality of input paths may be operable to isolate one or more portions of corresponding ones of the received plurality of input RF signals, and combine the isolated one or more portions of the corresponding ones of the received plurality of input RF signals onto one or more output signals. The one or more portions of corresponding ones of the received plurality of input RF signals comprise channels or frequency sub-bands. A bandwidth of the isolated one or more portions of the corresponding ones of the received plurality of input RF signals and a bandwidth of the one or more output signals may be variable and may be configured accordingly. The combiner 330 may be operable to extract and utilize the isolated one or more portions of the corresponding ones of the received plurality of input RF signals to generate the one or more output signals.

The crossbar 703 (FIG. 7) in the receiver may be operable to map the one or more portions of corresponding ones of the received plurality of input RF signals into one or more channel slots ($704_1, \ldots, 704_N$) in time domain. The receiver may be operable to assign the one or more channel slots ($704_1, \ldots, 704_N$) to one or more frequency bins ($706_1, \ldots, 706_N, 708_1, \ldots, 708_N$) in frequency domain. The mapping and/or the assigning may be done based on, for example, one or more of, a number of the one or more channel slots in time domain, a number of the one or more frequency bins, and/or a bandwidth of one or more channels or one or more frequency bands into which the extracted one or more portions of the corresponding ones of the received plurality of input RF signals is to be stacked. The frequency bins $706_1, \ldots, 706_N$ and the frequency bins $708_1, \ldots, 708_N$ may be offset to provide a particular overlap.

The plurality of input RF signals may be amplified, mixed, filtered, and/or analog-to-digital converted by the receiver within the plurality of input paths. The combining comprises mixing, adding, filtering, and/or digital-to-analog converting the isolated one or more portions of the corresponding ones of the received plurality of input RF signals within a plurality of output combining paths. The receiver may also be operable to equalize the isolated one or more portions of the corresponding ones of the received plurality of input RF signals prior to generating the one or more output signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for flexible channel and band stacking.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system comprising:
   channelizer circuitry operable to select a first number of channels of one or more received signals;
   crossbar circuitry operable to map the first number of channels to a second number of slots, where a first portion of the second number of slots correspond to a first one of two overlapping fast Fourier transform (FFT) grids, and a second portion of the slots correspond to a second one of the two overlapping fast Fourier transform (FFT) grids; and
   wherein a first half of said second number of slots are assigned to a first of two sets of frequency bins; and a second half of said second number of slots are assigned to a second of said two sets of frequency bins; and
   fast Fourier transform (FFT) circuitry operable to perform a fast Fourier transform on the two overlapping fast Fourier transform (FFT) grids to generate a stacked signal for output onto a communication link.

2. The system of claim 1, wherein the first number is less than the second number.

3. The system of claim 1, wherein the crossbar circuitry is operable to perform the mapping of the channels to the slots based on a bandwidth of one or more of the channels.

4. The system of claim 1, wherein the crossbar circuitry is operable to perform the mapping of the channels to the slots based on a bandwidth of the stacked signal.

5. The system of claim 1, wherein an amount of frequency overlap of the two frequency-overlapping FFT grids is determined based on a bandwidth of one or more of the channels.

6. The system of claim 1, wherein an amount of frequency overlap of the two frequency-overlapping FFT grids is determined based on a bandwidth of the stacked signal.

7. The system of claim 1, comprising digital-to-analog conversion circuitry operable to digitize the stacked signal.

8. The system of claim 1, wherein said channels are satellite television channels.

9. A method comprising:
- selecting, by channelizer circuitry of an electronic device, a first number of channels of one or more received signals;
- mapping, by crossbar circuitry of the electronic device, the first number of channels to a second number of slots, where a first portion of the second number of slots correspond to a first one of two overlapping fast Fourier transform (FFT) grids, and a second portion of the slots correspond to a second one of the two overlapping fast Fourier transform (FFT) grids; and
- wherein a first half of said second number of slots are assigned to a first of two sets of frequency bins; and a second half of said second number of slots are assigned to a second of said two sets of frequency bins; and
- performing, by fast Fourier transform (FFT) circuitry of the electronic device, a fast Fourier transform on the two overlapping FFT grids to generate a stacked signal for output onto a communication link.

10. The method of claim 9, wherein the first number is less than the second number.

11. The system of claim 9, wherein the crossbar circuitry performs the mapping of the channels to the slots based on a bandwidth of one or more of the channels.

12. The system of claim 9, wherein the crossbar circuitry performs the mapping of the channels to the slots based on a bandwidth of the stacked signal.

13. The system of claim 9, wherein an amount of frequency overlap of the two frequency-overlapping FFT grids is determined based on a bandwidth of one or more of the channels.

14. The system of claim 9, wherein an amount of frequency overlap of the two frequency-overlapping FFT grids is determined based on a bandwidth of the stacked signal.

15. The system of claim 9, comprising digitizing, by digital-to-analog conversion circuitry of the electronic device, the stacked signal.

16. The system of claim 9, wherein said channels are satellite television channels.

* * * * *